United States Patent Office 2,868,031
Patented Jan. 13, 1959

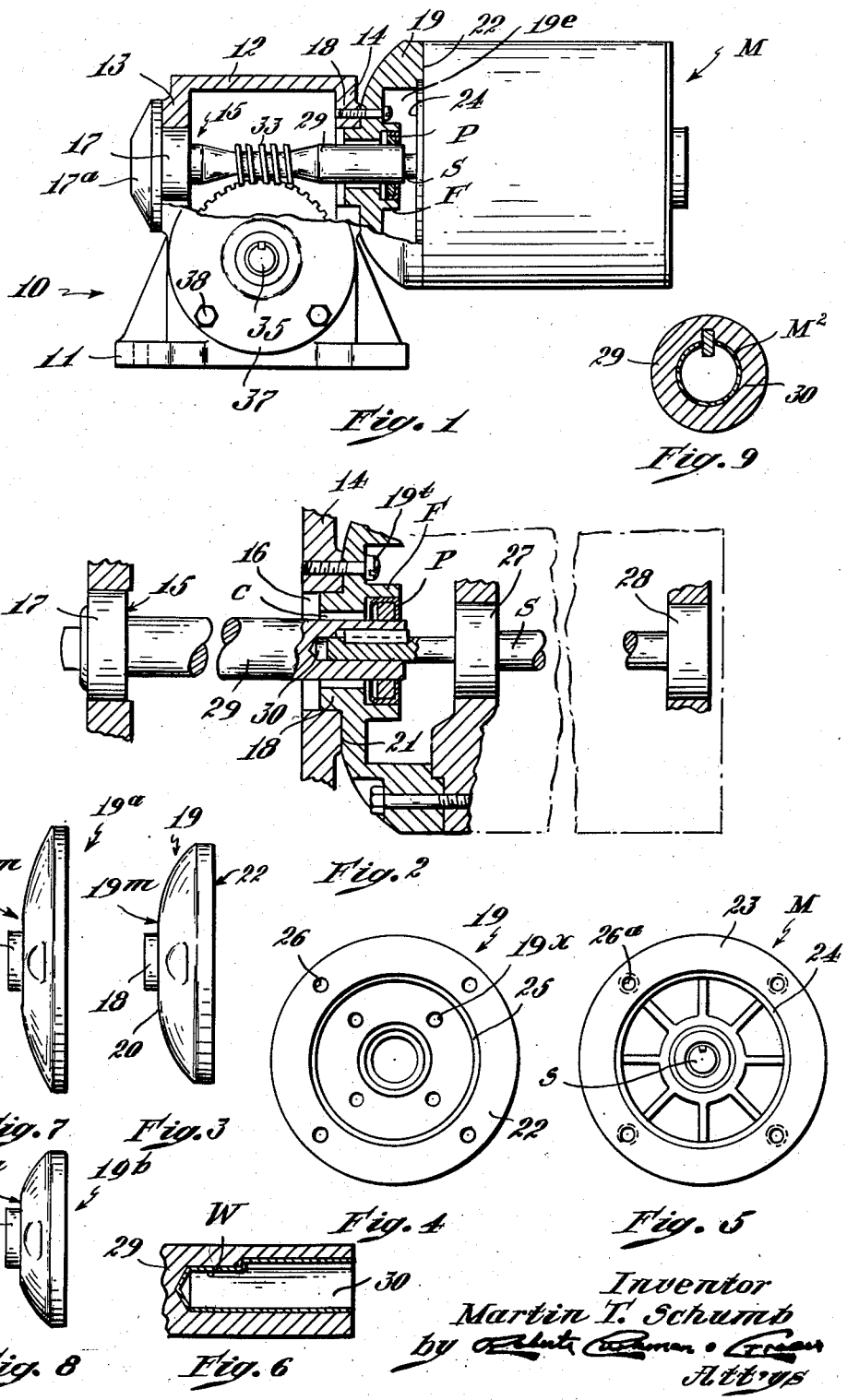

2,868,031

SPEED REDUCER WITH DETACHABLE DRIVE MOTOR

Martin T. Schumb, Milton, Mass., assignor to The Murray Company of Texas, Inc., Dallas, Tex., a corporation of Delaware Application August 6, 1956, Serial No. 602,169

4 Claims. (Cl. 74—425)

This invention pertains to speed reduction power units of the kind wherein reduction gearing (usually including a worm shaft) and an end-mounted electric drive motor are mounted upon the same base—this application being a continuation-in-part of my copending application Serial No. 509,456, filed May 19, 1955.

In speed reducers of usual commercial type the worm shaft, which is the first element of the reduction gearing, is mounted near its opposite ends respectively, in bearings which are supported by the opposite walls of the gear housing, and the shaft of the electric drive motor is directly coupled to one end of the worm shaft. Commercial electric motors are usually designed with spaced bearings for the opposite ends of the motor shaft, and when the motor shaft is directly coupled to the worm shaft of the reduction gearing it is necessary that the axes of the two shafts be in accurate alignment. Otherwise vibration and rapid wear will occur. Inaccurate alignment and consequent vibration is most likely to occur in apparatus which is designed to make ready removal and replacement of the motor easy of accomplishment by the user of the apparatus, for instance, for repairs or for substitution of a different motor, for example, one of a different type, such as an explosion-proof motor; a totally enclosed motor; a self-ventilated motor, or a motor of a different size. In the effort to overcome this difficulty it has been suggested from time to time that the bearing for one end of the worm shaft might be eliminated—said end of the worm shaft then being supported solely by its connection to the motor shaft. However, while such an arrangement is theoretically good, as a means for reducing vibration, previous embodiments of this idea have involved the employment of specially designed motors and/or reduction gear housings so that such previous suggestions are of no real value to the thousands of users of already existant speed reducers of types which have become more or less standardized in widespread use, and which customarily provide two bearings for the worm shaft and make use of a motor of a common commercial type. Moreover, in prior devices of this type, it has been found that as a result of fretting wear between the wall of the socket and the end of the shaft which fits within it, it is difficult or almost impossible to pull the shaft out of the socket after a substantial period of time.

The present invention has for one object the provision of a speed reducer wherein the gear housing and gearing, with the exception of the worm shaft, may be of customary type and construction, but wherein, by the use of a slightly modified worm shaft and a novel support for the motor, it becomes possible to obtain the advantages resultant from the elimination of one of the worm shaft bearings and to employ a motor of ordinary commercial type, and with provision whereby the motor may readily be detached for repairs, or replacement by another motor, and with the certainty that when the new motor has been put in place the apparatus will operate without undue vibration or rapid wear. A further object is to provide means for improving the operation of existent speed reduction mechanisms, by the use of a novel support for the motor, said support comprising a part which occupies the opening provided in the usual reduction gear housing for one of the worm shaft bearings, and which is so devised as to provide a firm and adequate means for securing the motor to the housing of the reduction gearing. A further object is to provide an arrangement whereby it becomes readily possible, while using the same gear housing, to attach thereto motors of different sizes without necessitating any change in the gear housing. A further object is to provide an arrangement of this type so designed that, upon removal of the motor from the gear housing, that end of the worm shaft which is normally supported by the motor shaft is so confined that it cannot drop down or move sidewise to any appreciable extent. A further object is to provide speed reduction apparatus having a removable motor and in which one end of the worm shaft is supported by the motor shaft, but with the parts so designed that upon removal of the motor, the lubricant which usually fills or partially fills the gear housing, will not be permitted to escape.

A further object is to provide a speed reducing power unit having a removable motor and wherein the motor shaft and worm shaft are normally substantially aligned, with the end of one of said shafts disposed in a socket at the end of the other shaft and with provision for preventing fretting wear between the shaft and socket wall. A further object is to provide a speed reducing power unit having a removable motor whose shaft is normally substantially aligned with the main shaft of the reducing gear and with the end of one shaft disposed in a socket at the end of the other shaft and having interposed between the shaft and the socket wall a bushing or liner of a material which prevents the shaft from sticking in the socket. Other and further objects and advantages of the invention will be pointed out in the following more detailed description and by reference to the accompanying drawings, wherein—

Fig. 1 is a front elevation of a speed reduction power unit embodying the present invention, but with certain parts in vertical section on the axis of the worm shaft to show the internal construction and in particular the relation of the motor shaft to the worm shaft;

Fig. 2 is a fragmentary vertical section in the same plane as Fig. 1 but to larger scale in order more clearly to show certain details;

Fig. 3 is an edge view of a bracket used for attaching the motor to the gear housing;

Fig. 4 is an elevation of the bracket of Fig. 3, viewed from the right-hand side of Fig. 1;

Fig. 5 is an end elevation of the motor casing separated from the other parts and viewed from the left-hand side of Fig. 1;

Fig. 6 is a fragmentary axial section through the right-hand end of the worm shaft, showing the lining film which coats the wall of the socket on a much enlarged scale;

Figs. 7 and 8 are edge elevations, similar to Fig. 3 showing brackets for supporting motors of other sizes respectively, and Fig. 9 is a transverse section through the socketed-end of the worm shaft, showing the key in place, and a liner of sheet material installed in the socket.

Referring to the drawings, the numeral 10 designates the frame of the apparatus. This frame as here shown is of a simple design such as has become more or less conventional in the trade. This frame is a casting comprising a rigid base of flange 11 having holes for the reception of anchoring bolts or lag screws—the frame also comprising the upright hollow portion or gear housing 12 which is integral with the base flange 11 and which has spaced side walls 13 and 14. As is customary in such apparatus, these side walls have aligned openings 15 and 16. Usually, each of these openings receives a bearing for an end of the main or worm shaft of the reduction gearing. In the present device only the opening 15 receives such a bearing, this bearing being indicated at 17.

A removable cover plate 17a (Fig. 1) normally covers the outer face of the bearing 17 to protect the latter from mechanical injury and from the entry of dust. The customary bearing opening 16 in the wall 14, instead of receiving a second bearing for the worm shaft, provides a socket for the reception of a rigid tubular hub member 18 projecting from the outer surface of a motor supporting bracket 19 (Figs. 1 and 3).

The motor supporting bracket 19, as illustrated in Figs. 3 and 4, is a circular dish-like casting or forging having a flat annular right-hand marginal end face 22 designed to contact the end face 23 (Fig. 5) of a motor M of the end-mounted type. Such a motor is customarily provided with an annular rib 24 projecting from the face 23 and concentric with the motor shaft S. In order to insure proper alignment of the motor shaft with the shaft 29 of the reduction gearing, the end face 22 of the bracket 19 has a rabbet 25 which receives the rib 24 of the motor casing with a snug fit. The bracket has spaced holes 26 (Fig. 4) for the reception of bolts (not shown) which enter screw-threaded holes 26a in the end face 23 of the motor casing, thereby detachably securing the motor to the bracket. The heads of these bolts (not shown) are exposed at the left-hand face of the bracket. The outer left-hand side of the bracket 19 has a face 19m (Fig. 3) which is flat and perpendicular to the axis of the bracket, and which is designed to make close contact with the flat outer surface of the wall 14 of the gear housing. Bolt holes 19x (Fig. 4) in the bracket receive bolts 19t (Fig. 2) by means of which the bracket is detachably secured to the wall 14. The bracket has the integral hub portion 18, above referred to, which is coaxial with the bracket 19 and which is of an external diameter to fit snugly in the opening 16 in the wall 14 of the gear housing. The hub 18 has a bore C (Fig. 2) which extends through the thickness of the wall of the bracket and which leads to a shallow chamber 19e (Fig. 1) which is open at the right-hand side of the bracket and which houses the end of the motor shaft S. At its inner side the bracket wall has an integral annular flange F (Fig. 1) coaxial with the hub 18 and which provides a chamber for the reception of packing P.

The motor shaft S turns in spaced aligned bearings 27 and 28 of conventional type forming usual elements of a motor assembly. The main or worm shaft 29 of the reduction gearing is aligned with the motor shaft S when the parts are assembled. This worm shaft (Fig. 6) has an axial bore or socket 30 (Figs. 1 and 6) in its right-hand end portion (as viewed in Fig. 1) for the reception of the left-hand end portion of the motor shaft S. The motor shaft is slidable into the bore or socket 30 and is splined to the drive shaft so that the drive and motor shafts turn as a unit, but by reason of the sliding engagement of the shafts the motor shaft is free from end thrust of the drive shaft 29. While the socket is in the end of the worm shaft, the reverse arrangement, with the socket in the end of the motor shaft, is within the broad scope of the invention.

The left-hand portion of the worm shaft turns in the single bearing 17 above referred to. This bearing is a conventional thrust bearing designed to oppose end thrust of the worm shaft, and may, if desired, be of the type known as a "self-aligning" bearing for instance. Merely by way of example, this bearing may be of the type disclosed in the patent to Wingquist 1,257,774, February 26, 1918, being so designed as to compensate for any slight divergence of the axis of the worm shaft from its intended position. The right-hand end portion of the worm shaft is of a diameter less than the internal diameter of the bore in the hub 18 of the bracket 19 so as to provide a slight but effective clearance C (Fig. 2) between the shaft 29 and the wall of the bore. Thus the worm shaft itself has only one bearing, that at 17, so that there can be no cramping of the worm shaft, even though the motor shaft S should not be accurately aligned with the axis defined by the centers of the openings 15 and 16 in the walls 13 and 14 of the gear housing, or if the drive shaft should not be absolutely coaxial with the hub 18, and thus there is no danger of the development of friction between the worm shaft and the wall of the bore in the hub 18. Moreover, with this arrangement and particularly when a bushing or liner for the socket 30 is provided (as hereinafter described) it is readily possible to remove the motor merely by withdrawing the bolts which attach it to the bracket and pulling the motor shaft out from the bore or its replacement by another. It should be noted that in thus removing and replacing the motor it is not necessary to disconnect shaft couplings or the like, so that the operation is simple and quickly performed.

Because in any commercially practical structure of this kind the axes of the shafts S and 29 do not run in mathematically accurate alignment, and because these shafts move relatively, to a slight amount, in the axial direction with a vibratory motion, the direct metal-to-metal contact of the end portion of shaft S with the wall of the socket 30 has been found to result in a fretting wear or erosion of the parts, such that after the apparatus has been running for a relatively short period, for instance, a period of a few hundred hours, the contacting parts seize so firmly that it is very difficult to pull the shaft S out of the socket, if it be desired to remove the motor for any reason, for instance, for repairs. To avoid such an occurrence, the present invention contemplates the inter-position, between the end portion of shaft S and the wall of socket 30 of a bushing of a material which is highly resistant to fretted wear. Such a sleeve, bushing or liner for the socket 30 is indicated at W in Fig. 6. Extended experiment has indicated that various synthetic plastic materials may be employed for this purpose. Nylon and polyethylene terephthalate (known by the trade name Mylar) are somewhat effective for the purpose, but the material known by the trade name "Molykote" and which chemically speaking is molybdenum disulphide provides optimum results. The preferred mode of using this material to form such a bushing or liner is to swab or spray the Molykote (thinned with oil) on the wall of the socket 30 (including the keyway therein); allowing the coating or film thus formed to dry for approximately ten minutes; and then baking the socket end of the shaft at a temperature of 350° F. for a period of thirty minutes, or alternatively, at a temperature of 400° F. for a period of fifteen minutes. The resultant coating, although only of the order of 0.01" thick, is so highly resistant to fretting wear that apparatus in which such a bushing has been provided has been run for periods measured in thousands of hours without any such coherence of the shafts as appreciably to interfere with the withdrawal of the shaft S from the socket 30. As above noted, nylon used for this purpose shows high resistance to fretting wear, but it has been found that a nylon bushing may develop cracks after a certain period of use. Mylar has also been found to show good resistance to fretting wear. This material Mylar (Fig. 9) in sheet form, may be applied by cutting a piece of the desired dimensions and then slipping it into the socket after the key has been inserted, so that the edges of the folded sheet contact opposite sides of the key.

In applying the Molykote as above described, it is preferred, as a precaution against the possible withdrawal of the bushing from the socket when the shaft is withdrawn, to prepare the socket for the reception of the Molykote by etching the surface so as to provide a good tooth for adhesion of the film of Molykote. This etching may be accomplished, for example, by spraying or swabbing the wall of the socket with a solution of a metallic phosphate such as magnesium phosphate, iron phosphate, or zinc phosphate. After application, the phosphate is allowed to dry, for instance, for a period of from two to ten minutes, after which the Molykote is applied as above described. The etching of the wall in this manner insures such a firm anchorage for the Molykote that after the latter has been baked, it cannot be removed except with the very greatest difficulty.

To prevent lubricant from following the shaft 29 into the motor casing, suitable packing P (Figs. 1 and 2) is arranged within the annular flange F at the inner side of the bracket 19.

As illustrated in Figs. 2, 7 and 8, motor supporting brackets 19, 19$^a$, 19$^b$, etc. of different diameters may be provided for supporting motors of different sizes respectively, but all such brackets are provided with hubs 18 of the same external diameter, so that any selected bracket may be mounted on the same gear housing.

While one form of reduction gear, including worm 33 and worm wheel 34, is here illustrated, it is to be understood that the present invention is not limited to the specific reduction gear mechanism employed, but is to be regarded as broadly inclusive of any and all devices of this general type, wherein it is desired to provide for the ready removal and replacement of a drive motor without disturbing the reduction gearing and with assurance that any slight inaccuracies in alignment of the assembled motor and worm shafts will not result in the production of undesirable noise, friction or vibration.

While a specific arrangement for mounting the motor and connecting the motor shaft to the worm shaft and for supporting the worm shaft is here illustrated, it is to be understood that the invention is broadly inclusive of any and all modifications falling within the scope of the appended claims.

I claim:

1. The combination in a speed reducer of the kind which has a rigid frame including spaced parallel walls defining opposite sides of a chamber which houses reduction gearing comprising a worm shaft having thereon a worm which meshes with a worm wheel—one end of the worm shaft having an axial bore which provides a socket for the reception of an end of a motor shaft, said walls of the housing having axially aligned openings, of a diameter appropriate to receive bearings for the worm shaft, and a bearing for one end of the worm shaft housed in one only of said openings, characterized in that the other of said openings houses a hub, in lieu of a bearing, said hub forming a part of a motor supporting bracket, the hub fitting snugly in said opening and having an axial bore of a diameter exceeding that of the worm shaft and through which the socketed end of the worm shaft passes with clearance, the bracket having at one side an annular flat face, perpendicular to the axis of the bore in the hub and from which the hub projects, which makes close contact with the outer surface of the apertured wall of the frame in which the bracket hub is housed, bolts passing through the bracket at said flat face for detachably securing the bracket to the last-named wall of the frame, the bracket having at its opposite side a flat face having therein an annular rabbet, coaxial with the bore in the hub, the bracket having a plurality of bolt holes at the region of said last-named flat face, an end-mounted motor having a casing, one end of the casing having an annular rib which fits in said rabbet in the bracket and which is detachably secured to the bracket by bolts passing through said last-named bolt holes, the motor having a shaft which turns in axially spaced bearings within the motor casing, one end of the motor shaft fitting within the aforesaid socket in the end of the worm shaft, means constraining the worm shaft to turn with the motor shaft while permitting relative coaxial motion of said shafts, and packing embracing that portion of the worm shaft which is external to the chamber of the speed reducer frame and which is operative to prevent escape of lubricant by flow along the worm shaft from the chamber in the frame.

2. A speed reducer, according to claim 1, wherein the worm shaft is of a length to extend outwardly through the bearingless opening in the frame wall and into the hub of the bracket whereby, upon removal of the motor, the end portion of the worm shaft will be supported by the hub, and means operative to prevent seizing of the motor shaft in the socket of the worm shaft resultant from fretted wear or corrosion of the shaft or socket wall.

3. A speed reducer, according to claim 2, wherein the means for preventing the motor shaft from seizing in the socket in the worm shaft consists of a bushing of an organic material lining said socket.

4. A speed reducer, according to claim 2, wherein the means for preventing seizing of the motor shaft in the socket in the worm shaft is a lining for the socket consisting of molybdenum disulphide.

References Cited in the file of this patent

UNITED STATES PATENTS

| | | |
|---|---|---|
| 779,907 | Cheshire | Jan. 10, 1905 |
| 1,657,245 | Day | Jan. 24, 1928 |
| 2,246,092 | Gilman | June 17, 1941 |
| 2,459,598 | Stott | Jan. 18, 1949 |
| 2,596,794 | Schmitter | May 13, 1952 |
| 2,622,993 | McCollough et al. | Dec. 23, 1952 |